May 24, 1960
G. K. NEWELL
2,937,725
DOUBLE-ACTING SLACK REGULATOR WITH
MANUAL FAST LET-OUT FEATURE
Filed Feb. 25, 1959
2 Sheets-Sheet 1
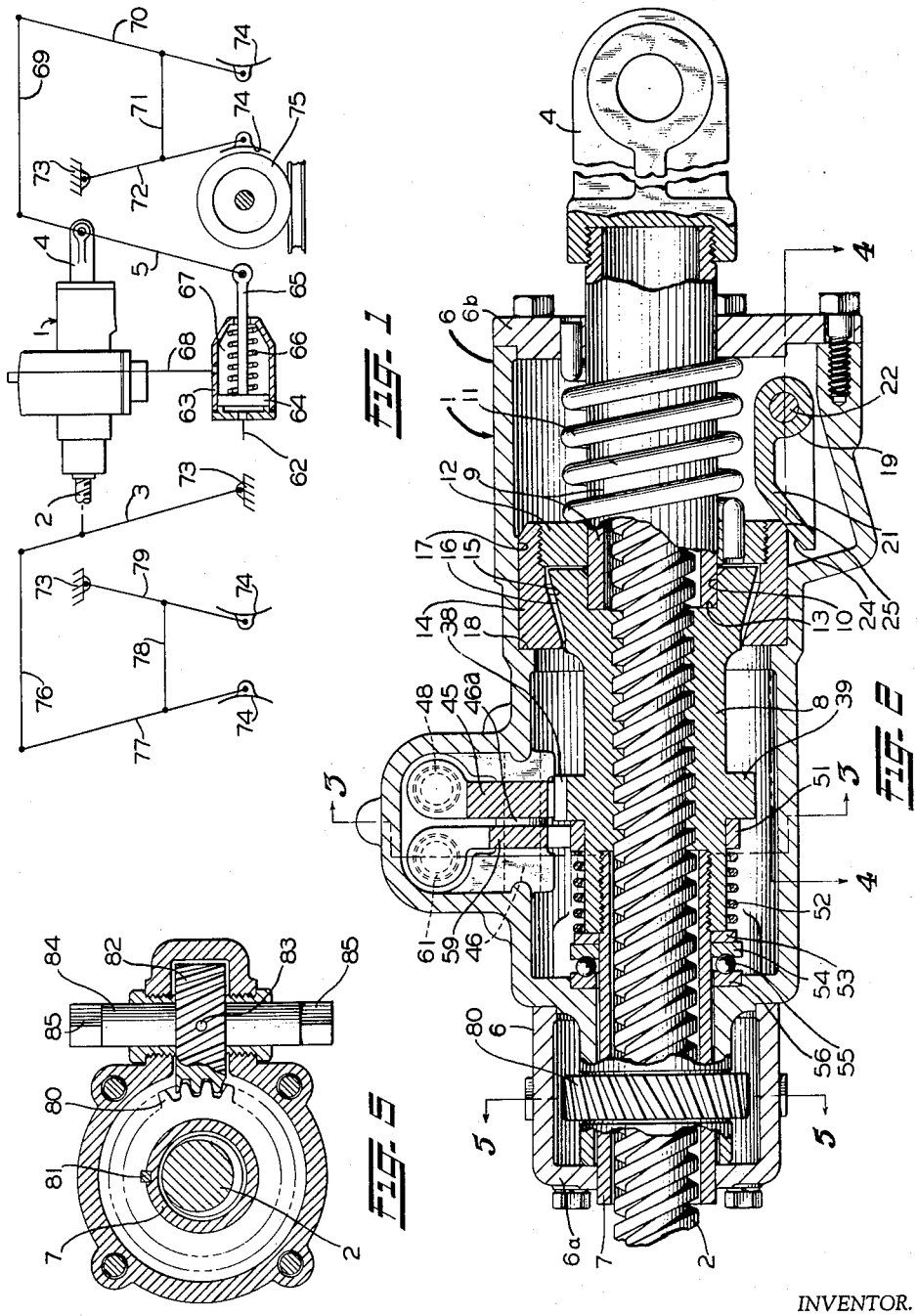
INVENTOR.
George K. Newell
BY
Henry E. Otto Jr.
Attorney

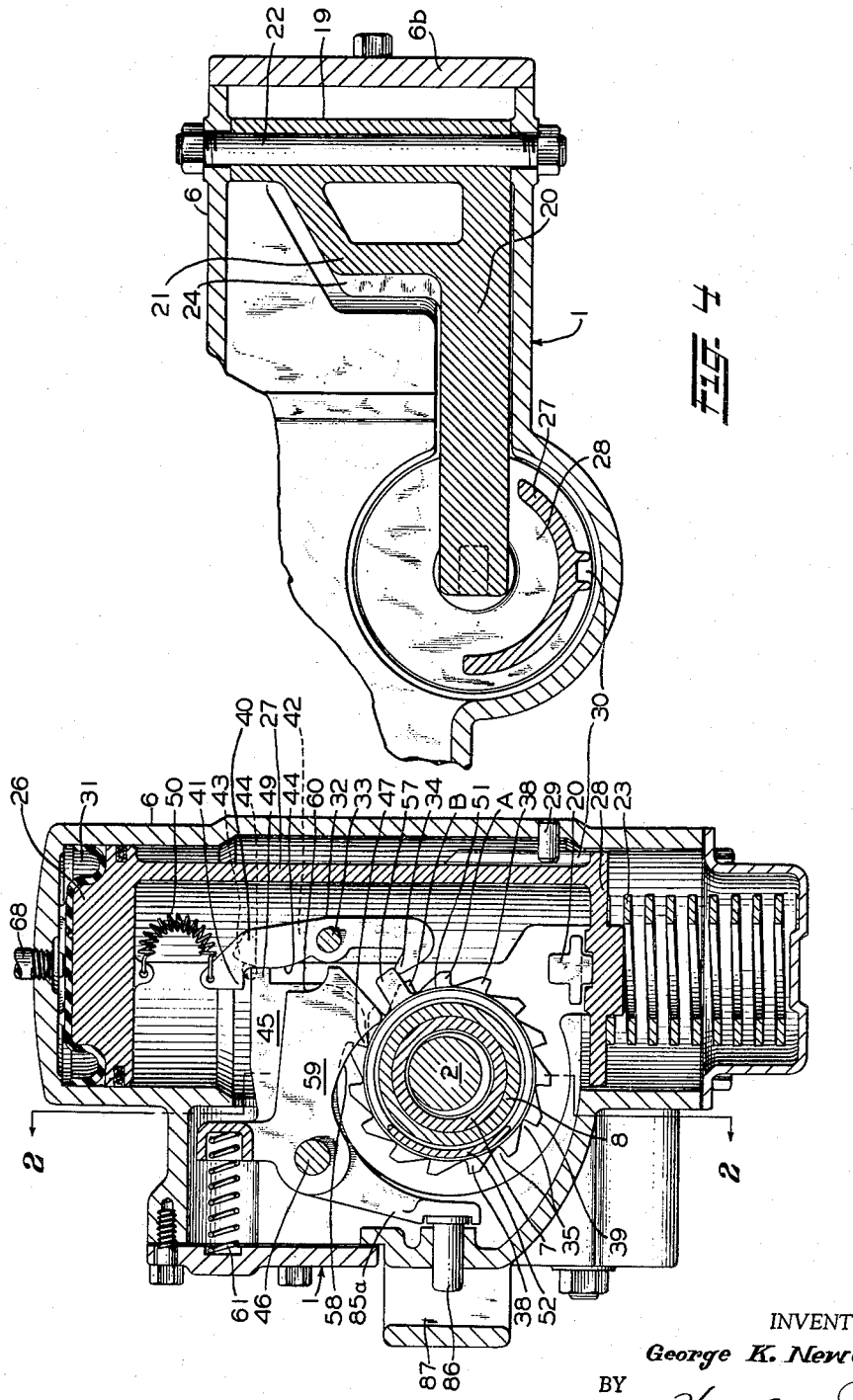

United States Patent Office 2,937,725
Patented May 24, 1960

2,937,725

DOUBLE-ACTING SLACK REGULATOR WITH MANUAL FAST LET-OUT FEATURE

George K. Newell, Penn Township, Westmoreland County, Pa., assignor to Westinghouse Air Brake Company, Wilmerding, Pa., a corporation of Pennsylvania Filed Feb. 25, 1959, Ser. No. 795,497

6 Claims. (Cl. 188—196)

This invention relates to double-acting regulators for adjusting the effective length of a two-part link in a linkage, and more particularly relates to double-acting regulators known as slack adjuster devices which are so conditioned during a brake application as to let out or take up slack in a brake rigging during a brake release according to whether travel of a brake cylinder piston during the brake application is less than or exceeds a predetermined amount corresponding to an ideal slack condition.

The principal object of this invention is to provide an improved regulator or slack adjuster device of the above type which is relatively inexpensive to manufacture because it embodies cast parts which require a minimum of machining.

According to this object, the improved adjuster device comprises a nonrotatable pull rod and an actuating means which are so connected to different members of a linkage, such as a brake rigging, as to tend to be pulled away from each other by a "run-out" torque when the linkage is tensioned. A rotatable adjusting nut and ratchet wheel assemblage has non-self-locking screw-threaded connection with the pull rod so that the pull rod will be moved outwardly or inwardly of the assemblage according to whether the assemblage is rotated one way or the opposite way. A normally vented pressure chamber will be maintained vented or will be charged with pressure fluid during tensioning of the linkage according to whether movement of the linkage under tension is less than or exceeds a predetermined amount.

With this arrangement, if the pressure chamber remains vented during tensioning of the linkage, the actuating means will move a limited extent against resistance of a power spring and, through an operating connection provided by such as a cam-and-follower means, operatively shift a piston means and a take-up pawl carried thereby a corresponding limited degree against resistance of a spring bias pressure for thereby causing the pawl to hook under a lug on a detent member and be rocked in a ratchet-wheel-disengaging direction, so that as linkage tension is relieved and the piston means and pawl are shifted by said spring bias pressure, the pawl will rock the detent member out of engagement with the ratchet wheel; whereupon the run-out torque will rotate said assemblage said one way until a cam element which has slip-friction-clutch-like engagement with said assemblage strikes and then rocks a dog for unhooking the pawl from said lug so that the detent member may reengage the ratchet wheel and lock the assemblage against further rotation said one way.

If, however, the pressure chamber is charged with pressure fluid during tensioning of the linkage, the piston means and pawl will be moved by such pressure fluid a greater degree against resistance of said spring bias pressure and independently of said operating connection for thereby causing said pawl to strike said dog and be rocked thereby in a ratchet-wheel-engaging direction, so that as tension is relieved and the piston means and pawl are shifted by said spring bias pressure, the pawl will rotate said assemblage the opposite way until it is carried out of effective contact with the ratchet wheel, the detent member ratcheting over the ratchet wheel and the cam element being prevented from rotating by contact with said dog during such rotation of said assemblage said opposite way.

The device preferably also comprises a toggle spring connected to said piston means and pawl for biasing said pawl in the ratchet-wheel-disengaging direction or the ratchet-wheel-engaging direction according to whether the piston means and pawl is moved said limited degree or said greater degree against said spring bias pressure, which degree of movement determines whether the point of connection of said toggle spring with said pawl is at one side or the other side of the axis of said piston means. The device also preferably comprises a friction clutch which when engaged locks the assemblage against rotation relative to said actuating means to resist the run-out torque which would otherwise have to be resisted by said detent member and which when engaged also prevents further compression of the power spring and by thus limiting the extent of axial movement of said actuating means determines said limited degree of movement of said piston means and pawl imparted via said operating connection.

Another object is to provide a regulator or slack adjuster device which embodies means readily accessible from either side of a railway car for effecting a manual let-out or take-up of slack in a brake rigging.

Other objects and advantages will become apparent from the following more detailed description of the invention and from the accompanying drawings, wherein:

Fig. 1 is a diagrammatic view of a railway car brake rigging with which is shown associated a slack adjuster device embodying the invention;

Fig. 2 is a longitudinal section view, to enlarged scale of the slack adjuster device shown in outline in Fig. 1, said view being taken along the line 2—2 of Fig. 3;

Fig. 3 is a section view taken along the line 3—3 of Fig. 2; and

Figs. 4 and 5 are section views taken along the lines 4—4 and 5—5, respectively, of Fig. 2.

Description

Referring to Fig. 1, a regulator or slack adjuster device 1 embodying the invention is provided to adjust the distance between the point of pivotal connection of a nonrotatable pull rod 2 with such as a dead brake lever 3 and the point of pivotal connection of a non-rotatable clevis-providing member 4 with such as a live brake lever 5.

As best shown in Fig. 2, the slack adjuster device 1 comprises a hollow sectionalized housing 6 within which all subsequently introduced elements are preferably disposed except as otherwise indicated. Pull rod 2 projects inwardly through one end wall 6a of the housing 6 and with radial clearance through a guide tube 7 that is coaxially connected to an adjusting nut 8; said pull rod having external, preferably triple, threads of such pitch as to be non-self-locking which mate with corresponding internal threads provided in said nut. The clevis-providing member 4 has a coaxially connected tubular extension 9 that projects through the opposite end wall 6b of the housing and adjacent its inner end has slidably guided contact with a counterbore 10 in the nut 8. At its respective ends a torsion-type power spring 11 has axially extending tangs that hook into suitable holes in the end wall 6b and in a collar 12 welded about extension 9 at a slight distance from its said inner end. This spring 11 resists rotation of the housing relative to the member 4 and its extension 9 and also acts axially through collar 12 to hold the inner end of extension 9 in abutting contact with a shoulder 13 joining the counterbore 10 with the threaded bore of nut 8.

Surrounding the outer periphery of collar 12 and positively connected thereto, such as by self-locking screw threads, is a friction clutch member 14. Member 14 has a beveled clutch surface 15 which flares outwardly in the direction of end wall 6b and overlies an oppositely flaring beveled clutch surface 16 encircling the nut 8. This member 14 also has slidably guided contact with the wall of a bore 17 provided between the ends 6a, 6b of the housing. Spring 11 acts through collar 12 for normally biasing the inner end of member 14 leftward to a normal position in which it abuttingly contacts a shoulder 18 projecting radially inward from bore 17 and in which position the clutch 15, 16 is disengaged.

A follower 19 comprises two integrally formed tandem arranged arms 20, 21 of different lengths and both of which extend leftward (as viewed in Figs. 2 and 4) from, and are rockably fulcrumed on, a transverse pin 22 carried by the housing 6. As will become apparent from subsequent description, the longer arm 90 is urged upward by the action of a helical return spring 23 (Fig. 3) to maintain a follower surface 24 on the shorter arm 21 in constant contact with a cam surface 25 defined by the beveled outer end of member 14.

As shown in Figs. 3 and 4, a piston 26 slidably mounted in the housing 6 has an integrally formed generally C-shaped stem 27 terminating in a generally circular preferably integrally formed base 28. A pin 29 extends through a side wall of the housing 6 and into an inverted U-shaped axially extending guideway 30 formed in the outer periphery of stem 27; said pin serving to prevent rotation of the piston 26 relative to the housing 6. Piston 26 is subject to the pressure of fluid in a pressure chamber 31 at the side thereof opposite stem 27 and to the opposing pressure of spring 23 which acts on the base 28. The longer arm 20 of follower 19 rides on the upper side of base 28 so as normally to be biased upward in the manner, and for the purpose, previously explained.

In the recess provided by the C-shaped piston stem 27 is a take-up pawl 32 that is rockably fulcrumed intermediate its ends on a transverse pin 33 which is carried by said piston stem at a point to the right side (as viewed in Fig. 3) of the center line of the piston 26. This pawl 32 has a hook-like depending arm 34 that is adapted, upon downward and clockwise movement of said pawl, to drop into one of a plurality of notches, such as 35, defined between the respective thrust faces and non-thrust faces of adjacent teeth, such as 38, formed on a ratchet wheel 39 that encircles and is positively connected to the adjusting nut 8 such as by being formed integrally therewith. Pawl 32 also has an upper arm 40 in the same plane as arm 34; and below its upper end, arm 40 provides a nose 41 facing away from pin 33. Pawl 32 also has a portion 42 which is offset axially from the upper arm 40 and provides a nose 43, one side of which is defined by a convexly curved follower surface 44 that extends downwardly from said nose.

A detent member 45 is rockably fulcrumed on a transverse pin 46 carried by the housing 6 and rockable in the same transverse plane as the nose 43 of take-up pawl 32. This detent member comprises a detent arm 47 that is normally, as shown in Fig. 3, disposed in one of the notches 35 of the ratchet wheel 39 to lock the latter and hence the nut 8 against rotation in a clockwise direction, as viewed in said figure, relative to the pull rod 2. Detent member 45 is normally urged to this locking or holding position by a helical spring 48 (see Fig. 2) which acts to rock said member in a direction toward the reader as viewed in Fig. 2, or in other words, clockwise about pin 46 as viewed in Fig. 3. Detent member 45 also comprises a cam lug 49 which is normally engaged by follower surface 44 of the pawl 32 due to the action of a toggle spring 50 that is connected at its respective ends to the non-pressure side of piston 26 and to the upper end of pawl arm 40; it being noted that this toggle spring, when its point of connection with arm 40 is leftward, as viewed and shown in Fig. 3 of the center line of the piston, acts to bias said pawl counterclockwise about pin 33.

As best shown in Fig. 2, a metering cam element or ring 51 is mounted about nut 8 and frictionally held in contact with one end of the ratchet wheel 39 by the pressure of a moderately heavy helical spring 52 that encircles nut 8 and is backed up by a washer 53 that, in turn, bears against one race 54 of a ring of ball bearings 55, the other race 56 of which bears against a radial shoulder of the housing 6. Projecting radially outward from this cam ring 51 is a single cam lug 57 (Fig. 3) that in one rotative position is adapted to engage the hook-like arm 34 of pawl 32 and in another rotative position is adapted to engage a concave follower surface 58 provided on a pawl throw-out dog 59.

Dog 59, which is rockably mounted on pin 46 and spaced from detent member 45 by a spacer or washer 46a (Fig. 2), has another concave cam surface 60 which is adapted to engage nose 41 of pawl 32. However, a helical bias spring 61, which is backed up by a side wall of the housing 6, acts on an arm of dog 59 for normally biasing said dog clockwise, as viewed in Fig. 3, about pin 46 to a position in which its surface 58 bears against a cylindrical part of the outer periphery of cam ring 51 and cam surface 60 is disengaged from nose 41.

*Operation*

Assume initially that, as shown in Fig. 1, a brake cylinder pipe 62 leading to a brake cylinder 63 is vented for causing a brake cylinder piston 64 and its piston rod 65 to be biased to a release position by the pressure of a return spring 66 in an atmospheric chamber 67. Under this condition, a pipe 68 which interconnects pressure chamber 31 in housing 6 with a port in the piston bore of the brake cylinder 63 will be connected to atmospheric chamber 67 for venting chamber 31; it being noted that said port opens through the wall of the piston bore at a point corresponding substantially to a desired maximum travel of the brake cylinder piston 64, such that this port and hence pipe 68 will be uncovered to, and charged from, the brake cylinder pipe 62 only when piston travel exceeds said desired maximum and thus denotes an excessive slack condition.

Under the assumed conditions, all components will be in the relative positions in which they are shown in the drawings.

Assume now that brake cylinder pipe 62 is charged with fluid under pressure for causing the piston 64 to move axially to effect an application of brakes. Under this condition, brake cylinder piston rod 65 will act on one end of live brake lever 5 causing it initially to rock counterclockwise relative to member 4 and through a tie rod 69 rock a brake lever 70 counterclockwise (as viewed in Fig. 1) relative to a link 71 that pivotally connects lever 70 with a brake lever 72 fulcrumed at one end on a fixed member 73, with the result that brake shoes 74 carried by the depending ends of levers 70, 72 will be rocked away from each other into frictional contact with respective wheels 75 (only one of which is shown) to be braked. Meanwhile, as the lever 5 rocks counterclockwise relative to member 4, it will pull the latter and thereby device 1 and the pull rod 2 rightward and rock dead lever 3 clockwise relative to fixed member 73 and, through a tie rod 76, rock a brake lever 77 clockwise relative to a link 78 that pivotally connects lever 77 with a brake lever 79 fulcrumed on fixed member 73, with the result that brake shoes 74 carried by the depending ends of levers 77, 79 will be rocked away from each other into frictional contact with corresponding wheels (75) to be braked.

It is to be noted that the brake rigging just described is merely illustrative of one conventional form of rigging arrangement, and that the slack adjuster device 1 may be used in other well-known brake rigging arrangements, or in some form of linkage arrangement not necessarily employed in a brake apparatus.

*Insufficient slack condition*

If slack in the brake rigging is less than the desired amount, the various brake shoes 74 will frictionally engage their corresponding wheels 75 before piston 64 has moved far enough against the force of spring 66 to uncover pipe 68 to the brake cylinder pipe 62. Hence, the pipe 68 and thus pressure chamber 31 of device 1 will remain vented during the brake application.

Meanwhile, as tension builds up in the rigging in consequence of the supply of pressure fluid to brake cylinder 63, the member 4 and hence parts 9, 12 and 14 rigidly connected thereto, and hereinafter referred to as an actuating assemblage or actuating means, will tend to be pulled rightward relative to nut 8 by the action of live brake lever 5. However, the bias force of power spring 11 acting on collar 12 of the actuating assemblage, plus the bias effect of spring 23 which is multiplied by the leverage of longer follower arm 20 and acts through the shorter follower arm 21 on friction clutch member 14 of said assemblage, will resist movement of said assemblage 4, 9, 12, 14 rightward relative to nut 8 until tension on the device 1 exceeds a preselected value, such as about 800 pounds. After this preselected value is exceeded, the actuating assemblage 4, 9, 12, 14 will be pulled rightward relative to nut 8 and compress spring 11 and at the same time, through the camming action at 25, 24, rock shorter follower arm 21 counterclockwise about pin 22 (as viewed in Fig. 2) for, in turn, causing the longer follower arm 20 to depress base 28, and hence (through the operating connection just defined between the actuating assemblage 4, 9, 12, 14 and the piston 26) shift the piston stem 27, piston 26 and the pawl-carrying pin 33 downward against resistance of spring 23. This downward movement will continue until the actuating assemblage 4, 9, 12, 14 is moved axially a limited degree against resistance of spring 11 sufficient to effect engagement of clutch 15, 16, which engagement will occur when tension on the device 1 attains a preselected higher value such as about 1000 pounds.

Meanwhile, since the point of connection of the toggle spring 50 with pawl arm 40 is still at the left of the center line of piston 26, said spring will bias pawl 32 counterclockwise about pin 33 and thus assure that as pin 33 and hence pawl 32 is carried downward this limited degree through the medium of the operating connections 25, 24, 21, 20, pawl surface 44 will initially ride down along lug 49 of detent member 45 until nose 43 of said pawl swings in below said lug 49 and thus rocks pawl arm 34 away from lug 57 on cam element 51.

Meanwhile, it will be noted that as tension on the device 1 increases, due to the buildup of brake cylinder pressure, the triple threads of the pull rod 2 tend to run out of, and thus develop a torque on, the nut 8. This torque may be as much as 5 to 10% of the tension being exerted on the slack adjuster device 1; and since under conditions of heavy braking, this tension might reach maximums of from 18,000 to 36,000 pounds, the runout torque might reach values of 1800 to 3600 lb.—in. Cluch 15, 16 has therefore been provided, as a safety measure, to not only limit the degree that piston 26 can be moved downwardly by the actuating assemblage 4, 9, 12, 14, but also hold these potentially high run-out torques, which unless such clutch were provided would have to be transmitted to the housing 6 via detent member 45 and pin 46. With the arrangement herein disclosed, clutch 15, 16 will become engaged when the run-out torque is very slight, such as about 125 lb.—in., corresponding to a moderate force of such as about 85 pounds on the detent member 45. Until clutch 15, 16 is engaged, the run-out torque will be resisted by the torsion spring 11, which will wrap up not more than a few degrees; however, after it is engaged, the clutch 15, 16 will take over and resist whatever additional torque may be developed.

When the brake cylinder pipe 62 is subsequently vented for releasing the application of brakes, power spring 11 assisted by the action of spring 23 will shift the actuating assemblage 4, 9, 12, 14 far enough leftward relative to nut 8 to disengage clutch 15, 16 when tension on the device 1 is reduced below the illustrative 1000 pounds, and also permit spring 23 to push base 28 and hence piston stem 27, piston 26 and the pawl-carrying pin 33 upward. As pawl 32 is thus carried upward, its nose 43, through engagement with the lower side of lug 49, will push detent member 45 upward and thus carry detent 47 out of engagement with ratchet wheel 39; whereupon said ratchet wheel and the nut 8 to which it is positively connected will start to spin clockwise, as viewed in Fig. 3, relative to the non-rotatable pull rod 2 due to the torque then being exerted on the triple threads of the pull rod. This clockwise spinning of the non-axially movable nut 8 on the non-rotatable pull rod 2 will cause the latter to be moved axially outward relative to the nut and effectively increase the distance between the points of connection of the pull rod and member 4 with the levers 3 and 5, respectively, for thereby increasing the slack in the brake rigging.

Meanwhile, since cam element 51 is held in lateral slip-friction-clutch-like contact with the ratchet wheel 39 by the pressure of spring 52, element 51 will be rotated clockwise, as viewed in Fig. 3, in unison with the ratchet wheel and nut 8. Since pawl nose 43 is still disposed under lug 49 of detent member 45, the counterclockwise movement exerted on pawl 32 by spring 50 will maintain the hook-like arm 34 of said pawl in a retracted position. Hence, as element 51 is rotated clockwise, its cam lug 57 will be carried past the retracted arm 34 for nearly a complete revolution and then successively strike surface 58 of dog 59 and then rock said dog counterclockwise about pin 46. As dog 59 is thus rocked, surface 60 of said dog will successively strike nose 41 of pawl 32 and then rock said pawl clockwise about pin 33 for swinging pawl nose 43 out of engagement with lug 49 of detent member 45 against resistance of spring 50; whereupon detent member 45 will be rocked clockwise about pin 46, as viewed in Fig. 3, by the pressure of heavy spring 48 (Fig. 2) and carry detent 47 down into a notch 35 between adjacent ratchet wheel teeth 38 for locking the ratchet wheel 39 and hence nut 8 against further rotation relative to the pull rod 2 and hence terminating let-out of slack.

Thus, the cam element 51 serves as a slack let-out control member to limit the let-out of slack to a degree corresponding to the amount of axial movement of the pull rod 2 effected by substantially one complete revolution of the ratchet wheel 39 and nut 8. The actual amount of slack let out will, of course, depend upon the selected lead of the threads on pull rod 2 and the leverage ratios of the rigging.

It will thus be noted that during release of the brake application, tension in the brake rigging and hence on the slack adjuster device 1 will reduce rapidly upon venting of the brake cylinder pipe 62; that the slack let-out operation will not commence until the tension on the slack adjuster device has decreased below the illustrative 1000 pounds and thus permits springs 11 and 23 to effectively disengage clutch 15, 16; that by the time the detent 47 of member 45 engages the ratchet wheel 39 for terminating the slack let-out operation, the tension on the slack adjuster device 1 will have been reduced substantially below the illustrative 1000 pounds and to approximately 500 to 600 pounds; that due to the inherent inefficiency of the fast threads of the screwjack type provided on the pull rod 2 and nut 8, the tangential force on the ratchet wheel 39 will be a small percentage of the existing tension on the slack adjuster device 1; and that the detent member 45 is of relatively light weight. Hence, when detent 47 moves into engagement with the spinning ratchet wheel 39, the impact force will be light due to the relatively light weight of the detent member 45; and the shock effect will be relatively small when the detent 47 effectively engages one of the teeth 38 and stops rotation of said ratchet wheel. It will also be understood that if the detent 47 happens to strike the tip of one of the ratchet wheel teeth 38, the detent will merely ride down the non-thrust face of such tooth and then hookingly lock in against the thrust face of the adjacent tooth.

Meanwhile, as the detent 47 of detent member 45 is forced downward by spring 48 into engagement with the ratchet wheel 39, lug 49 on the detent member will be carried downward along the follower surface 44 of pawl 32 and thus rock said pawl clockwise about pin 33 to a normal position, in which it is shown, and in which the hook-like arm 34 of said pawl will be disposed in the path of rotation of cam element lug 57 and will be engaged by said lug for preventing the cam element 51 from making more than one revolution. Also, after the lug 57 has been rotated clockwise past the surface 58 of dog 59, the light spring 61 will rock said dog clockwise into contact with the cylindrical surface of element 51.

Hence, the various components will once again be in the respective positions in which they are shown in the drawings, except that the pull rod 2 will have been moved axially a slight distance leftward out of the housing 6 for increasing the normal slack clearance between the brake shoes 74 and wheels 75.

*Excessive slack condition*

Assuming now that slack in the brake rigging is excessive, the brake cylinder piston 64 will have to travel beyond the desired maximum amount in order to operatively effect frictional engagement of the brake shoes 74 with the corresponding wheels 75, and hence will cause fluid under pressure to be supplied from brake cylinder pipe 62 to pipe 68 and hence to pressure chamber 31 of device 1.

Pressure fluid thus supplied to chamber 31 will promptly shift piston 26 downward against resistance of spring 23 and independently of the operating connections 25, 24, 21, 20. As pin 33 and hence pawl 32 are thus carried downward, pawl nose 41 will successively contact and then ride downward along the concave surface 60 of dog 59 for rocking said pawl clockwise about pin 33 until the point of connection of toggle spring 50 with pawl arm 40 is moved rightward of the center line of piston 26; whereupon said spring will exert a clockwise moment on pawl 32 and swing pawl arm 34 into the notch 35 below that ratchet wheel tooth 38 identified by the letter "A," to condition the device 1 to take up slack during release of the brake application, in the manner presently to be explained.

Meanwhile, since the tension on the device 1 is tending to pull the pull rod 2 out of the nut 8, there will be a run-out torque exerted on the nut 8, as previously described. However, due to the depression of spring 23 by the pressure fluid acting on piston 26, follower arm 21 will exert no bias force resisting rightward movement of the actuating assemblage 4, 9, 12, 14 rightward relative to nut 8; and hence clutch 15, 16 will be engaged when tension in the device 1 exceeds merely the bias effect of spring 2, which is preferably about 500 pounds. Once the clutch 15, 16 is engaged it will resist any additional torque which may be developed, as will be understood from previously description.

When the brake cylinder pipe 62 is vented for releasing the application of brakes, the pressure chamber 31 will be promptly vented via pipe 68 and atmospheric chamber 67; whereupon piston 26 and hence pin 33 and pawl 32 will be forced upward by spring 23. As the pawl 32 is moved upward, it will, through hooking engagement with ratchet wheel tooth A, rotate the ratchet wheel 39 and hence nut 8 counterclockwise through a small angular increment corresponding to a "two-tooth turn" or, in other words, to the point where a ratchet wheel tooth denoted by the letter "B" is shown in Fig. 3 of the drawings. Rotation of nut 8 counterclockwise through this small angle will advance the pull rod 2 inwardly of the housing 6 a slight distance, for effecting a slight take-up of slack in the brake rigging and thus reducing by a proportionate amount the brake cylinder piston travel which will be required to effect engagement of the brake shoes 74 with the corresponding wheels 75 during the next application of brakes.

Meanwhile, due to the clockwise moment then being exerted on pawl 32 by spring 50, pawl arm 34 will continue to engage tooth A until after pawl nose 43 has been carried upwardly past and to the right of lug 49. Since nose 43 will not strike the lug 49, spring 48 will maintain detent 47 in contact with the ratchet wheel 39 as the latter rotates; however, this detent will merely ride up along the non-thrust faces of two successive teeth 38 as such teeth pass by it. Also, as the ratchet wheel 39 rotates, cam element 51 will be prevented from rotating therewith due to contact of lug 57 with the dog 59; it being noted that the dog will remain in contact with the cylindrical surface of element 51, and that the slip-friction-clutch-like lateral contact of the cam element with the ratchet wheel will permit relative rotation therebetween.

Pawl arm 34 will probably remain in engagement with one of the teeth 38 of the ratchet wheel 39 after piston 26 attains its normal position, in which it is shown, because there will be no force or moment tending to shift the point of connection of the toggle spring 50 with pawl arm 40 leftward of the center line of said piston. However, this is of no consequence because during the next application of brakes, as the piston 26 and hence pin 33 is moved downward (whether by action of longer follower arm 20 under an insufficient slack condition or by supply of pressure fluid to pressure chamber 31 under an excessive slack condition), the pawl 32 will be carried downward and cause arm 34 to ride down along the inclined non-thrust face of the tooth then below arm 34, with the result that the pawl 32 will be rocked counterclockwise about the downwardly moving pin 33 and thus carry arm 40 and hence the point of its connection with toggle spring 50 leftward of the center line of piston 26. This rocking of arm 40 will occur during the initial phase of the downward movement of pawl 32 and hence before pawl nose 43 drops under lug 49 (in the case of an insufficient slack condition) or before pawl nose 41 strikes dog surface 60 (in the case of an excessive slack condition). Thus, during the next brake application, the slack adjuster device 1 will be conditioned to operate in the manner above described to let out or take up slack, depending upon whether travel of the brake cylinder piston 64 is insufficient or is sufficient to charge pipe 68 with fluid under pressure from brake cylinder pipe 62.

It is to be noted that the nut 8 and ratchet wheel 39 cannot move axially. When brakes are released, the extension 9 of actuating assemblage 4, 9, 12, 14 contacts shoulder 13 of nut 8 under the force of spring 11, and the parts 53, 54, 55, 56 hold the nut against leftward movement. When the rigging is under tension during a brake application, the run-out torque exerted by the pull rod threads on the nut 8 prevents it from being moved rightward and holds the nut in contact with parts 53, 54, 55, 56.

*Manual adjustment of slack*

As best shown in Fig. 5, the slack adjuster device 1 preferably comprises a helical spur gear 80 suitably locked, as by a key 81, to the guide tube 7 which is positively connected to the adjusting nut 8. This gear 80 meshes with a mating helical pinion 82 that is secured, as by a pin 83, to a shaft 84 disposed at right angles to the axis of tube 7. Adjacent its ends, which project exteriorly of the housing 6, the shaft 84 has wrench engageable portions 85 which are accessible from either side of the car and may be turned by such as a long handled socket-type crank (not shown) to permit rotation of the shaft 84 and hence the nut 8 through the medium of pinion 82, gear 80 and tube 7.

Since with brakes released the detent 47 will be engaged with the ratchet wheel 39 and prevent it from being rotated clockwise (the slack-increasing or let-out direction), it will be necessary to first disengage the detent to permit manual rotation of the nut 8 clockwise in the manner just described. This is preferably accomplished by providing the detent member 45 with an arm 85a (Fig. 3) which is engageable by a pin 86 slidably mounted in, and projecting exteriorly of, the housing 6 into a slot 87 in said housing, and so arranged that by insertion of a pry bar into said slot, the pin 86 may be depressed for rocking the detent member 45 counterclockwise about pin 46 and thereby disengaging the detent 47.

In the event the last automatic operation of the slack adjuster device 1 was a slack take-up operation, the pawl arm 34 may be in engagement with the ratchet wheel 39, as above noted. However, this pawl arm 34 may be disengaged by effecting a slight manual rotation of shaft 84 in a take-up direction before attempting to let out slack.

Since the detent 47 does not prevent the ratchet wheel 39 from being rotated counterclockwise (the slack decreasing or take-up direction), the shaft 84 may be rotated to take up slack without requiring depression of pin 86 by a pry bar.

Having now described the invention, what I claim as new and desire to secure by Letters Patent, is:

1. In an adjuster device of the type for varying the extent of permissible maximum movement of a linkage under tension, the combination of a nonrotatable pull rod and a nonrotatable actuating means arranged coaxially and both so connected to different components of the linkage as to tend to be pulled away from each other when the linkage is tensioned, a housing, a rotatable adjusting nut in the housing having non-self-locking screw-threaded connection with said pull rod, friction clutch means operative when engaged to prevent rotation of said nut relative to said actuating means, a power spring operatively bearing against the housing and biasing said actuating means axially into operative engagement with said nut for normally disengaging said friction clutch means, nonrotatable piston means subject opposingly to a spring bias pressure and to pressure of fluid in a normally vented chamber which is charged with pressure fluid only when actual maximum movement of the linkage during tensioning exceeds a predetermined amount, means providing an operating connection between said actuating means and piston means, a toothed ratchet wheel rigidly secured to and encircling said nut, a cam element having lateral slip-friction-clutch-like engagement with said ratchet wheel so as normally to rotate in unison therewith, a detent member rockably carried by the housing and spring biased into engagement with the toothed portion of the ratchet wheel for normally locking the latter and thereby said nut against rotation in a maximum-movement-increasing direction relative to said pull rod, a throw-out dog carried by the housing and spring biased into contact with said cam element, a take-up pawl operatively connected to said piston means so as to be reciprocable by said piston means and rockable transversely relative to said piston means, and a toggle spring connected to said piston means and pawl for normally rockably biasing said pawl away from said toothed portion; these components cooperating in such manner that when said chamber is vented during tensioning of the linkage, said actuating means will be moved axially relative to said nut and compress said power spring until said friction clutch means is engaged for thereby, through said operating connection, shifting said piston means and pawl axially a corresponding limited degree against said spring bias pressure for thereby causing said pawl to hook under a lug on the detent member and permit said pawl to be rocked away from said toothed portion by said toggle spring so that during release of the brake application and consequent axial movement of said piston means and pawl by said spring bias pressure, said pawl through engagement with said lug will disengage said detent member from said toothed portion and permit the ratchet wheel and cam element to rotate through a large angular increment for spinning the nut in said maximum-movement-increasing direction on the pull rod, said cam element during its last described rotation so rocking said dog as to cause the latter to strike and then disengage said pawl from said detent member and thereby permit the latter to re-engage the toothed portion and lock said nut against further rotation; whereas when said chamber is charged with pressure fluid during tensioning of the linkage, said piston means and pawl will be moved axially a greater degree independently of said operating connection for thereby causing said pawl to strike said dog and be rocked toward said toothed portion, such that upon venting of said chamber and consequent axial movement of said piston means and pawl by said spring bias pressure, said pawl will be maintained by said toggle spring in contact with said toothed portion and rotate said ratchet wheel and thereby spin said nut in a maximum-movement-decreasing direction on said pull rod until said pawl is carried out of effective contact with said toothed portion, said detent member meanwhile ratcheting over said toothed portion and said cam element meanwhile being held against rotation with said ratchet wheel through contact of said cam element with said dog.

2. The combination according to claim 1, including one gear rigidly connected to said nut so as to be rotatable therewith, another gear meshing with said one gear, a shaft staked to said other gear and projecting exteriorly of the housing, said shaft having at at least one of its ends a wrench-engageable portion to enable said shaft to be manually rotated to operatively rotate said nut relative to said pull rod and thereby manually adjust the extent of such permissable maximum movement of the linkage, and means manually operable for rockably disengaging said detent member from said toothed portion to permit said nut to be rotated in said maximum-movement-increasing direction.

3. In an adjuster device of the type comprising a rotatable non-axially movable adjusting nut disposed in a housing and a nonrotatable pull rod having non-self-locking screw-threaded connection with the adjusting nut so as to be displaced outwardly or inwardly of the adjusting nut according to whether the adjusting nut is rotated one way or the opposite way, the combination of a toothed ratchet wheel rigidly associated with the nut, a cam element having a slip-clutch-like friction connection with said ratchet wheel so as normally to rotate in unison therewith, nonrotatable piston means reciprocable in a path at right angles to the axis of said ratchet wheel and subject opposingly to pressure of fluid in a chamber and to a spring bias pressure, a pawl reciprocably carried by and rockable relative to said piston means and engageable with the toothed portion of said ratchet wheel, a detent member rockably carried by the housing and spring biased into engagement with said toothed portion for locking said ratchet wheel and the nut against rotation said one way, a pawl throw-out dog rockably carried by the housing and spring biased into engagement with said cam element, nonrotatable actuating means to which a tension force may be applied tending to pull said actuating means away from the pull rod, a torsion-type power spring biasing said actuating means toward the nut and having tangs which hook into the housing and actuating means to resist rotation of the housing relative to the actuating means, means providing an operating connection between said actuating means and piston means whereby said piston means may be moved axially a limited degree upon movement of said actuating means by said tension force, said actuating means being operative when said tension force exceeds a predetermined amount while said chamber is vented to operatively through said operating connection shift said piston means and pawl axially said limited degree against resistance of said spring bias pressure for causing said pawl to hook under a part of said detent member, such that upon a reduction in said tension force below said predetermined amount and consequent axial movement of said piston means and pawl by said spring bias pressure said pawl through engagement with said part will rock said detent member away from and thus free said ratchet wheel and thereby permit the nut and cam element to spin said one way and cause said cam element to rock said dog into striking contact with said pawl for so rocking said pawl as to unhook the latter from said part and thereby enable said detent member to be spring biased into re-engagement with said toothed portion for locking said ratchet wheel and the nut against further rotation said one way, said piston means being responsive to charging of said chamber to shift said pawl axially against resistance of said spring bias pressure a greater degree than said limited degree and independently of said operating connection and cause said pawl to be rocked by contact with said dog into hooking engagement with said toothed portion, such that upon venting of said chamber and consequent axial movement of said piston means and pawl by said spring bias pressure said pawl through its hooking engagement with said toothed portion will spin said ratchet wheel and the nut said opposite way through a small arcuate increment until said pawl is carried out of effective engagement with said toothed portion, and including spring means for rotatively biasing said pawl in a ratchet-wheel-disenging direction or the reverse direction according to whether said piston means and hence said pawl is moved said limited degree or said greater degree against said spring bias pressure.

4. In a slack adjuster device of the type comprising a rotatable non-axially movable adjusting nut disposed in a housing and a nonrotatable pull rod having non-self-locking screw-threaded connection with the adjusting nut so as to be displaced in a slack-reducing direction or a slack-increasing direction relative to the adjusting nut according to whether the adjusting nut is rotated one way or the opposite way, the combination of a toothed ratchet wheel rigidly associated with the nut, an annular cam element having a slip-clutch-like friction connection with said ratchet wheel so as normally to rotate in unison therewith, nonrotatable piston means reciprocable in a path at right angles to the axis of said ratchet wheel and subject opposingly to pressure of fluid in a chamber and to a spring bias pressure, a pawl reciprocably carried by and rockable relative to said piston means and engageable with the toothed portion of said ratchet wheel, a detent member rockably carried by the housing and spring biased into engagement with said toothed portion for locking said ratchet wheel and the nut against rotation said one way, a pawl throw-out dog rockably carried by the housing and spring biased into engagement with said cam element, actuating means arranged coaxially with the nut, a friction clutch operative when engaged to lock the nut against rotation relative to said actuating means, a power spring acting on said actuating means for biasing it to a clutch-disengaging position, means providing an operating connection between said actuating means and piston means, said actuating means being operative when a tension force acting to pull said actuating means away from said pull rod exceeds a predetermined amount while said chamber is vented to effect engagement of said friction clutch and operatively through said operating connection shift said piston means and pawl axially against resistance of said spring bias pressure a limited extent as limited by the engagement of said friction clutch for causing said pawl to rock in one direction and hook under a part of said detent member, such that upon a reduction in said tension force below said predetermined amount and consequent disengagement of said friction clutch and axial movement of said piston means and pawl by said spring bias pressure, said pawl through engagement with said part will rock said detent member away from said ratchet wheel and permit the nut and cam element to spin said one way and cause said cam element to rock said dog into striking contact with said pawl for so rocking said pawl in the opposite direction as to unhook the latter from said part and thereby enable said detent member to be spring biased into re-engagement with said toothed portion for locking said ratchet wheel and nut against further rotation said one way, said piston means being responsive to charging of said chamber to shift said pawl axially against resistance of said spring bias pressure a greater extent independently of said operating connection and not limited by engagement of said friction clutch and cause said pawl to initially rock in said one direction and then be so rocked in said opposite direction by contact with said dog as to hookingly engage said toothed portion, such that upon venting of said chamber and consequent axial movement of said piston means and pawl by said spring bias pressure said pawl will through its hooking engagement with said toothed portion spin said ratchet wheel and the nut said opposite way through a small arcuate increment until said pawl is carried out of effective engagement with said toothed portion, said dog through contact with said cam element acting to prevent spinning of the latter said opposite way in unison with said ratchet wheel and including toggle spring means for rocking said pawl in said one direction or said opposite direction according to whether said piston means is moved against said spring bias pressure said limited extent or said greater extent.

5. An automatic slack adjuster device interposed between two levers of a brake rigging for increasing and decreasing slack in the brake rigging according to whether a brake cylinder piston travels within or beyond predetermined range in effecting a brake application, said device comprising housing means, a nonrotatable pull rod pivotally connected to one of the levers, nonrotatable actuating means arranged coaxially with the pull rod and pivotally connected to the other of the levers, a rotatable nut having non-self-locking screw-threaded connection with said pull rod, a power spring for biasing said actuating means axially into operative engagement with said nut, nonrotatable piston means subject opposingly to a spring bias pressure and to pressure of fluid in a normally vented chamber that is charged with pressure fluid only when the brake cylinder piston travels beyond said predetermined range, means rockably carried by the housing means and providing an operating connection between said piston means and said actuating means, a toothed ratchet wheel rigidly secured to and encircling said nut, a cam element spring pressed into operative lateral frictional contact with the ratchet wheel so as normally to rotate in unison therewith, a detent member rockably carried by the housing means and spring biased into engagement with the ratchet wheel for normally locking the latter and thereby said nut against rotation in a slack-increasing direction relative to said pull rod, a pawl throw-out dog rockably carried by the housing means and spring biased into contact with the cam element, a take-up pawl operatively connected to said piston means so as to be reciprocable by said piston means and rockable transversely of the path of travel of said piston means, a toggle spring connected to said piston and to said pawl for normally biasing said pawl rockably in a ratchet-wheel-disengaging direction and biasing said pawl in a ratchet-wheel-engaging direction only when the point of connection of said toggle spring with said pawl is shifted crosswise of the axis of said piston means, and means for limiting the degree of compression of said power spring and thereby limiting the degree of axial movement which can be imparted to said piston means by said operating connection; the aforementioned components cooperating in such manner that when said chamber remains vented during a brake application, said actuating means will be moved linearly relative to said nut and against resistance of said power spring and operatively through the medium of said operating connection shift said piston means and pawl axially such limited degree against said spring bias pressure for thereby causing one nose on said pawl to drop under a lug on said detent member and permit said pawl to be rocked in said ratchet-wheel-disengaging direction by said toggle spring, so that during release of the brake application and consequent movement of said piston means and pawl by said spring bias pressure, said one nose through engagement with said lug will rock said detent member out of engagement with said ratchet wheel and permit the latter and said cam element to rotate through a large angular increment for causing the nut to spin in a slack-increasing direction on said pull rod, said cam element during its last-described rotation rocking said dog into contact with another nose on the pawl for rocking said one nose out of engagement with said lug and thus permitting the detent member to re-engage the ratchet wheel and lock said nut against further rotation; whereas when said chamber is charged with pressure fluid during a brake application, said piston means and pawl will be moved axially against said spring bias pressure a greater degree than said limited degree for thereby causing said other nose to strike said dog and thereby rock said pawl in a ratchet-wheel-engaging direction and so shift said point of connection of the toggle spring therewith that upon venting of said chamber and consequent axial movement of said piston means and pawl by said spring bias pressure, said pawl by action of said toggle spring will be held in engagement with and will rotate said ratchet wheel and hence spin said nut in a slack-reducing direction on said pull rod until said pawl is carried out of effective contact with said toothed portion, said detent member meanwhile ratcheting over the toothed portion and said cam element meanwhile being prevented from rotating with the ratchet wheel through contact of said cam element with said dog.

6. A slack adjuster device according to claim 5, characterized in that said means for limiting the degree of compression of said power spring is a friction clutch which is normally disengaged by the force of said power spring and is engaged when the tension in the brake rigging tending to pull the pull rod and actuating means apart is sufficient to shift said actuating means axially a slight distance relative to said nut against the force of said power spring, said friction clutch when engaged serving not only to limit the degree of compression of said power spring but also prevent spinning of said nut relative to said actuating means and thus prevent excessive torque from being developed on the detent member while it is engaged with the ratchet wheel during a brake application.

No references cited.